United States Patent
Miyamoto et al.

(10) Patent No.: US 7,222,229 B1
(45) Date of Patent: May 22, 2007

(54) SYSTEM FOR AUTOMATED BOOT FROM DISK IMAGE

(75) Inventors: Carleton Miyamoto, San Jose, CA (US); Jagadish Bandhole, Cupertino, CA (US); Sekaran Nanja, San Jose, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 0 days.

(21) Appl. No.: 11/292,596

(22) Filed: Dec. 2, 2005

Related U.S. Application Data

(63) Continuation of application No. 10/241,809, filed on Sep. 10, 2002, now Pat. No. 6,986,033.

(51) Int. Cl.
*H04L 9/00* (2006.01)

(52) U.S. Cl. .............................. 713/1; 713/2; 713/176; 713/177; 713/187; 713/188; 713/189; 713/191

(58) Field of Classification Search .................... None
See application file for complete search history.

(56) References Cited

U.S. PATENT DOCUMENTS

| | | | |
|---|---|---|---|
| 5,410,707 A | 4/1995 | Bell ............................... | 713/2 |
| 5,418,918 A | 5/1995 | Vander Kamp et al. ........ | 713/2 |
| 5,452,454 A | 9/1995 | Basu ............................. | 713/2 |
| 5,463,766 A | 10/1995 | Schieve et al. ................ | 713/2 |
| 5,694,600 A | 12/1997 | Khenson et al. ............... | 713/2 |
| 5,727,213 A | 3/1998 | Vander Kamp et al. ........ | 713/2 |
| 5,842,011 A | 11/1998 | Basu ............................. | 713/2 |
| 5,942,738 A | 8/1999 | Cesaire et al. ............... | 235/380 |
| 5,974,547 A | 10/1999 | Klimenko ....................... | 713/2 |
| 6,085,318 A | 7/2000 | Vander Kamp et al. ........ | 713/1 |
| 6,092,189 A | 7/2000 | Fisher et al. .................... | 713/1 |
| 6,262,726 B1 | 7/2001 | Stedman et al. ............. | 345/333 |
| 6,298,443 B1 | 10/2001 | Colligan et al. ............ | 713/200 |
| 6,304,965 B1 | 10/2001 | Rickey .......................... | 713/2 |
| 6,308,238 B1 | 10/2001 | Smith et al. ................. | 710/310 |
| 6,317,826 B1 * | 11/2001 | McCall et al. ................. | 713/1 |
| 6,317,879 B1 * | 11/2001 | Jacobson et al. ........... | 717/127 |
| 6,463,535 B1 * | 10/2002 | Drews ........................ | 713/176 |
| 6,477,624 B1 | 11/2002 | Kedem et al. ............... | 711/147 |
| 6,498,791 B2 | 12/2002 | Pickett et al. ............... | 370/353 |
| 6,512,526 B1 | 1/2003 | McGlothlin et al. ......... | 345/762 |

(Continued)

OTHER PUBLICATIONS

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.

(Continued)

*Primary Examiner*—A. Elamin
(74) *Attorney, Agent, or Firm*—Campbell Stephenson Ascolese LLP

(57) ABSTRACT

A system allowing a target machine to be booted up from a disk image stored in memory. Instead of reading the boot-up information from a disk drive or other physical device the data is read from memory. No modification is necessary to native operating system, input/output subsystem, bootstrap code, etc., since the invention modifies characteristics, such as vectors used by the operating system, to make the disk image in memory appear to be the same as a standard external device.

25 Claims, 2 Drawing Sheets

U.S. PATENT DOCUMENTS

| | | | |
|---|---|---|---|
| 6,539,456 B2 | 3/2003 | Stewart | 711/113 |
| 6,577,229 B1 | 6/2003 | Bonneau et al. | 340/10.41 |
| 6,598,131 B2 | 7/2003 | Kedem et al. | 711/147 |
| 6,615,365 B1 | 9/2003 | Jenevein et al. | 714/6 |
| 6,662,267 B2 | 12/2003 | Stewart | 711/113 |
| 6,704,840 B2 * | 3/2004 | Nalawadi et al. | 711/118 |
| 6,804,774 B1 | 10/2004 | Larvoire et al. | 713/2 |
| 6,986,033 B2 * | 1/2006 | Miyamoto et al. | 713/1 |
| 6,996,706 B1 * | 2/2006 | Madden et al. | 713/2 |
| 7,017,038 B1 * | 3/2006 | LaChance et al. | 713/2 |
| 7,058,797 B2 * | 6/2006 | Miyamoto et al. | 713/1 |
| 7,093,124 B2 * | 8/2006 | Girard | 713/164 |

OTHER PUBLICATIONS

Henry, Mike, Intel Corporation, *Extending PXE to Mobile Platforms*, Jun. 1998, pp. 1-4, http://www.intel.com/update/archive/psn/psn06985.pdf.

* cited by examiner

SYSTEM FOR AUTOMATED BOOT FROM DISK IMAGE

CROSS-REFERENCES TO RELATED APPLICATIONS

This application is a continuation of U.S. patent application Ser. No. 10/241,809, entitled "System for Automated Boot From Disk Image," filed Sep. 10, 2002, now U.S. Pat. No. 6,986,033 and naming Carleton Miyamoto, Jagadish Bandhole and Sekaran Nania as inventors, which is related to the following U.S. patent application Ser. No. 09/663,252 entitled "USER INTERFACE FOR DYNAMIC COMPUTING ENVIRONMENT USING ALLOCABLE RESOURCES" filed on Sep. 15, 2000, now U.S. Pat. No. 7,082,521; Ser. No. 10/241,808 entitled "SYSTEM FOR MANAGING BOOT-UP OF TARGET COMPUTERS" filed on Sep. 10, 2002, now U.S. Pat. No. 7,069,428; and Ser. No. 10/241,749 entitled "USE OF OFF-MOTHERBOARD RESOURCES IN A COMPUTER SYSTEM" filed on Sep. 10, 2002, now U.S. Pat. No. 7,058,797. All of the aforementioned applications and their disclosures are incorporated herein by reference for all purposes.

BACKGROUND OF THE INVENTION

This invention relates in general to digital data processing and more specifically, to a system for managing start-up, or boot-up of computer systems.

When a computer system is first powered up many functions must take place to put the computer into an operational stage. These functions are commonly referred to as "boot-up," "booting," "bootstrapping," "booting up," etc.

Typically, the booting procedure is well defined for any given machine. However, procedures can vary from computer to computer especially where the computers have different resources and peripherals, are configured differently, have been made by different manufacturers, are intended to execute different software, etc.

In some computer applications, it is desirable to coordinate, interconnect and configure multiple computer systems so that more computing power, or resources are available. The prior art provides some ways to control the boot-up of a target machine, such as a personal computer (PC). For example, one common prior art method is to boot from an executable image on a floppy disk.

Typically, if a floppy disk is detected in a PC's floppy drive during boot-up, the PC loads the executable image from the floppy drive and transfers control to the executable image. By providing boot-up from a floppy, users can easily direct specific booting of their machines. This approach works well for situations where a user wants to, e.g., boot to a specific operating system, allow an application to take control of the PC at boot-up, etc. However, this approach is not desirable when automated booting of many different machines is desired since inserting a floppy disk into a PC is a manual operation. When there are dozens, hundreds, or thousands of target machines to be managed, the approach of booting from a physical floppy is prohibitive.

BRIEF SUMMARY OF THE INVENTION

The present invention allows a target machine to be booted up from a disk image stored in memory. Instead of reading the boot-up information from a disk drive or other physical device the data is read from memory. No modification is necessary to native operating system, input/output subsystem, bootstrap code, etc., since the invention modifies characteristics, such as vectors used by the operating system, to make the disk image in memory appear to be the same as a standard external device.

Multiple floppy images are supported as separate floppy drives (e.g., A: and B:). User-defined arguments can also be passed from a server to a booted machine. This allows the server to have additional control over how programs on the floppy images execute. OpForce supports both an A: and a B:.

In one embodiment the invention provides a method for using a computer system to execute information stored on a physical medium, the method comprising copying information in the physical medium to an electronic file; storing the electronic file in random access memory in the computer system; changing one or more characteristics in the computer system so that a process executing in the computer system is provided with data from the stored electronic file when an access to a physical device is attempted; and using the computer system for executing at least a portion of the information in the random access memory.

In another embodiment the invention provides an apparatus for managing boot-up of a target computer, the apparatus comprising a server computer; memory within the server computer for storing an image of a boot disk; and code stored within the server computer for directing the target computer to access a part of target computer memory instead of a physical peripheral.

DETAILED DESCRIPTION OF THE INVENTION

Figure 1:
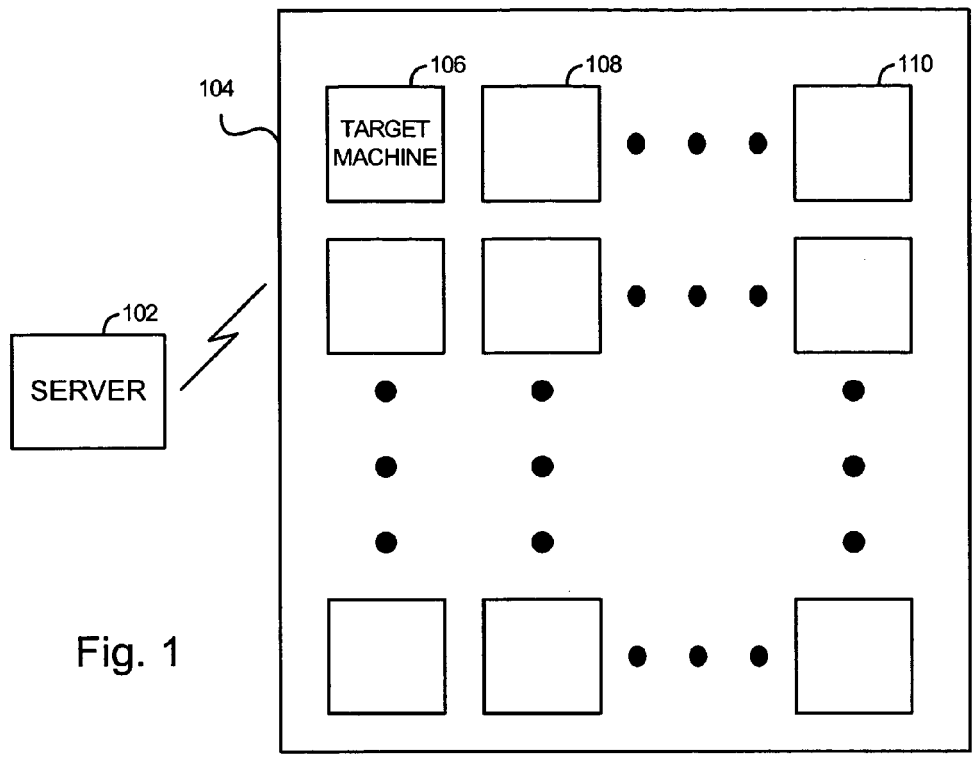
FIG. 1 shows an application of the system of the present invention.

FIG. 1 shows an application of the system of the present invention.

In FIG. 1, server 102 is a computer system for managing target machines in a configurable network. The configurable network is represented by resources 104. Any type of processing equipment or devices can be considered resources including processing units, memory, communication bandwidth, storage, functionality, etc. Such resources can be provided by software, hardware or a combination of both.

Server 102 detects when target machines such as 106, 108 and 110 are initially powered up. A preferred embodiment of the invention requires a human administrator to manually power up one or more target machines. Other embodiments can automate the power-up process. Server 102 then acts to control the boot up of one or more of the target machines, as desired. During boot-up, characteristics and resources that are local to a specific target machine (e.g., disk drive, random-access memory (RAM), processor type, peripherals, communication ability such as network cards, etc.) are determined or "discovered" and reported back to the server. After controlled boot-up and discovery, server 102 can also activate, allocate, or configure, resources, including resources 104, to work with a target machine. Server 102 can manage operations including loading software on the target machines, directing interconnectivity of target machines on a network, etc.

A preferred embodiment of the invention is adapted for use with dynamic computing environments (DCEs) such as the DCE described in co-pending U.S. patent application Ser. No. 09/663,252 entitled "USER INTERFACE FOR DYNAMIC COMPUTING ENVIRONMENT USING ALLOCABLE RESOURCES" filed on Sep. 15, 2000.

Target machines can be any type of computer system or other processing device. For example, personal computer systems, servers, workstations, mainframes, etc., can be target machines. Such machines can be based around different manufacturers' designs such as Intel, Advanced Micro Devices (AMD), SUN Microsystems, etc. Different models, versions and configurations of machines are typically available from each manufacturer. For example, some machines may vary in the processor type, attached peripherals, internal memory capacity, communication ability, etc. Target machines can also be devices that are not based on a general purpose microprocessor design. For example, target devices can be based on parallel processing, distributed processing, asynchronous or other designs. Target machines can be standalone peripherals, network devices, etc. Target machines can use customized circuitry, application-specific integrated circuits (ASICs), field-programmable gate arrays (FPGAs), discrete, dedicated or custom circuitry, etc. In general, any type of device, including digital, analog, mechanical, biotechnology, optical, etc. can be a target machine.

In the preferred embodiment, the target machines are interconnected based on a specific configuration. The interconnection mechanism can be by hardwire, fiberoptic, wireless or other type of communication link. A digital network such as, e.g., Ethernet, IEEE 1394, universal serial bus (USB), 802.11b, etc. can be used. In a preferred embodiment, the linking of communication channels between target machines, the server, external devices and networks (such as the Internet), etc., is controlled and managed by the server.

Note that server 102 can, similarly, be any type of a processing device from any manufacturer. Many types of processing devices can be used to implement server 102. Additionally, different types of software from those specifically discussed herein can be run on server 102 to achieve the same functionality described in the present invention. Multiple computers or devices can be used to achieve the functionality of the managing server, discussed herein. In the preferred embodiment, the managing server executes software manufactured by Jareva Technologies, Inc., and referred to as "OpForce." Other software that performs functionality described herein manufactured by Jareva Technologies, Inc., includes "ActiveOS" and "OpBoot."

A preferred embodiment of the invention executes on Intel x86 chips and is written in a standard Linux INITRD format. OpBoot is treated as a Network Boot Program (NBP) within the Linux environment as defined by the PXE (Pre-boot Execution Environment) standard. Steps accomplished by this preferred embodiment are listed in Table I, below.

TABLE I

1. Initialize and read parameters form DHCP option-135 (see, e.g., DHCP standard RFC-2131 for description of DHCP options);
2. TFTP the two ActiveOS files into extended memory into the standard locations defined by Linux; and
3. Jump to the start of the Linux kernel (as defined by Linux).

Another embodiment executes on a Solaris platform. The Solaris version of the ActiveOS is a miniaturized version of the Sun Solaris OS. A bootstrap program is TFTPed and the rest of the ActiveOS is NFS mounted using the standard Solaris mechanisms. It should be apparent that any type of software that achieves the functions, operations and other aspects of the invention can be suitable for use in accordance with the invention and is within the scope of the invention, as claimed.

A preferred embodiment of the invention uses popular standardized protocols to allow the managing server to prepare target machines for communication and operation upon boot-up. The Dynamic Host Configuration Protocol (DHCP) is used to automate the assignment of Internet Protocol (IP) addresses in the resource network. A Bootstrap Protocol (BOOTP) along with DHCP options and BOOTP vendor information extensions is also used. This allows target machines without disks and specific bootstrapping software to discover the target machine's own IP address, the address of a server host and the name of a file to be loaded into memory and executed. Descriptions of these protocols can be found on the Internet, or by reference to the following Request For Comments (RFCs): RFC9510, RFC2131 and RFC2132. Other protocols for communicating within the DHCP framework include: Boot Control Transfer Protocol (BCTP), Trivial File Transfer Protocol (TFTP), user datagram protocol (UDP) and others. It should be apparent that the specific use of these protocols is not necessarily to practice the invention. In general, any type of protocol, communication scheme, network architecture, etc. can be acceptable for use with the present invention.

A preferred embodiment of the invention uses a mechanism whereby, upon powerup, a target machine communicates to the server that the target machine is ready to boot. In the preferred embodiment, each target machine is provided with a Network Interface Card (NIC) such as one that follows the Preboot Execution Environment (PXE) standard. The PXE NIC broadcasts a "ready-to boot" message to the server upon powerup. The server then transfers an executable object to the target machine. In a contemplated embodiment, the executable object is about 8 MB and is called ActiveOS. ActiveOS is loaded and executed via instructions in OpBoot onto the target machine. ActiveOS then inspects the target machine to discover the hardware configuration, basic input/output system (BIOS) version and other aspects of the target machine. In the preferred embodiment, ActiveOS runs completely in memory so that no hard disk is needed since some target machines may not have a hard disk. ActiveOS is based on LINUX and launches a LINUX kernel to put up a TCP/IP stack.

Table II shows some of the information discovered and sent back to the server by ActiveOS.

TABLE II

Memory
Hard disks
Central Processing Unit (CPU)
Motherboard chip set
System management (BIOS) information Serial number
Model name
BIOS date/version
Computer manufacturer
BIOS vendor
Computer CPU family TABLE II-continued Blade Chassis Location (if it is a blade)
Blade chassis serial number (if it is a blade)
Blade chassis IP address (if it is a blade)
Blade chassis model (if it is a blade)
Rack serial number
Network cards Table III shows an example of a format used to report information back to the server in a preferred embodiment. Note that other embodiments can use any suitable format. The protocol used in Table III is BCTP.

TABLE III

StatusComplete 1 memsize = 128; archi = 686; chipset = 8086.7124; cpus = 1; cpumhz = 598; net = {count = 2; 0 = {name = eth0; type = Ethernet; hwaddr = 00:D0:B7:7E:94:BA}; 1 = {name = eth1; type = Ethernet; hwaddr = 00:90:27:F9:5B:B5}}; hd = {count = 1; 0 = {name = /dev/hda; size = 13}}; smbios = {BSmanufacturer = {Intel\sCorp.}; BSversion = {CA81020A.86A.0005.P02.9911300426}; BSreleaseDate = {11/30/1999}; MBcpuCount = 1; MBavgCpuMhz = 600; MBcpuFamily = 17; MBmem = 128}

In the preferred embodiment, the information in Table II, and additional information, as desired, is acquired from the target machine when ActiveOS receives a request from the server to generate hardware information. The results of discovering hardware information are sent back to server 102 in the form of scoped attribute value pairs in BCTP protocol. Again, other formats can be employed.

After discovery, the server provides a provisioning agent to the target machine. The provisioning agent is used to install desired software on the target machine. Since different hardware configurations require different types, or versions, of software, the provisioning agent is not loaded until after the hardware configuration of the target machine has been discovered. In a preferred embodiment, the provisioning agent is part of the ActiveOS.

A management system on the server receives a request either automatically, or from a user, that provides a definition of how to configure the target machines and other resources. The server communicates to the provisioning agent which software to install. The provisioning agent can also obtain the software to be installed from the server or from a different source.

By default, the provisioning agent obtains the software from a storage server, such as an NFS server, a CIFS server, the OpForce server, etc. In general, the software can be obtained from any server connected to the network using a variety of protocols including custom software. OpForce supports a form of software called "ActiveOS software". The user can write a custom program that runs on the ActiveOS. This program is free to implement a protocol and gather information from any server reachable on the network. In fact, the user can use this to extend the hardware detection that we already do.

The user first writes a standard Linux based application. This application is the uploaded into the OpForce system and placed on a storage server. When requested by the user, OpForce tells the ActiveOS to execute the software stored on the storage server. The BCTP messages looks similar to those shown in Table IV.

TABLE IV

SetAppDir nfs nfsserver:/directory
Modify myExecutable 1 argument1

When receiving this message, the ActiveOS accesses the NFS server, obtains the executable, and executes it.

Table V, below, shows basic steps in a procedure for controlled booting of a target machine where the target machine uses an Intel x86 architecture. Table V also shows, in curly brackets, the alternative protocol to be used when the machine is a SOLARIS type of machine as manufactured by SUN Microsystems, Inc., rather than an Intel machine. In a similar manner, other types of machines can be accommodated.

TABLE V

| 1. | Use DHCP {Solaris = RARP} broadcast to find MAC |
| 2. | OpForce (or other server software) allocates IP and send DHCP {Solaris = RARP} response |
| 3. | Target downloads OpBoot through TFTP {Solaris = not used} |
| 4. | OpBoot downloads ActiveOS through TFTP {Solaris = NFS} |

Different versions of ActiveOS are downloaded depending on the detected platform (e.g., SOLARIS OR INTEL). A preferred embodiment automatically determines the correct ActiveOS to use without any user input. DHCP option 60 (see the PXE standard), includes a string containing the architecture that is used to automatically select the correct ActiveOS. The target machine is then booted into the ActiveOS as previously described. ActiveOS is then used to discover the hardware in the machine. These are all done automatically without any user input and without any OS on the machine's hard disk. Other embodiments can use different degrees of manual and automatic operations.

Figure 2:
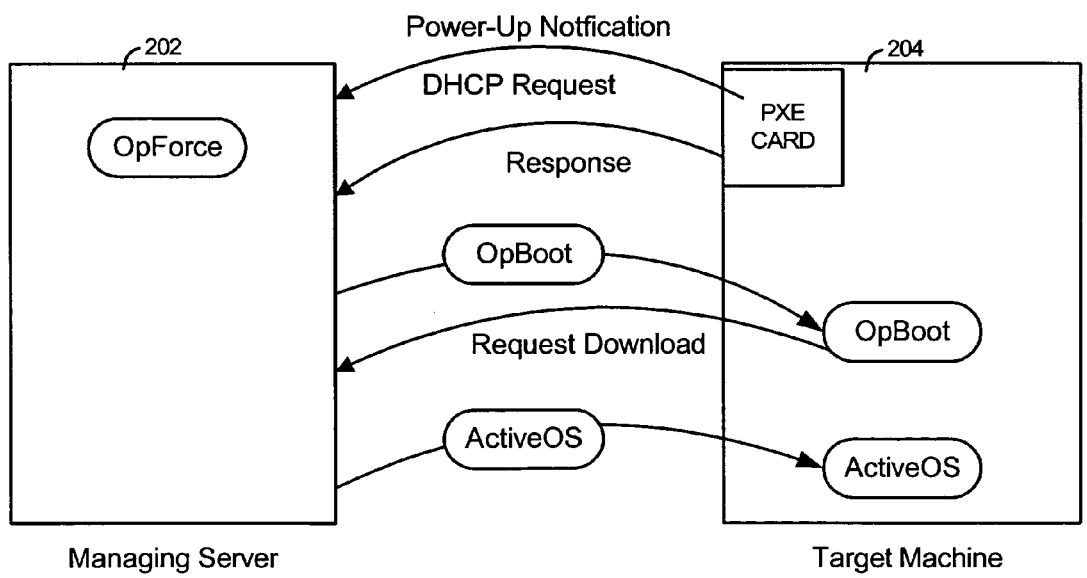
FIG. 2 illustrates steps in a managed boot-up procedure.

FIG. 2 illustrates the steps of Table V. In FIG. 2, managing server 202 controls the boot-up of target machine 204. For ease of illustration, only a single target machine, and single type (Intel architecture) of target machine, is discussed.

Upon power-up, target machine 204 sends a notification to managing server 202. In the preferred embodiment, the notification is made using a PXE card installed in the target machine. In other embodiments, different notification mechanisms can be used. PXE uses the DHCP protocol to generate a request, or notification. OpForce, executing in the managing server, receives the request, allocates an IP address and sends a response. Next, the target machine requests a download of software from the managing server. This results in the managing server transferring OpBoot. The target machine then executes OpBoot which requests a download of ActiveOS. ActiveOS is provided by the managing server and is installed and run on the target machine.

Automated Boot from Disk Image

After ActiveOS is loaded, one option provided by the system of the present invention is to allow the target machine to boot from a disk image. This option is very useful for systems, such as personal computers, that are designed to boot from a floppy disk. Preferably, the disk image is in random-access memory (RAM), but any type of storage, other than storage device that typically reads the disk image, is possible. The disk image can be distributed automatically from the managing server to one or more target machines. The procedure described herein is designed for PC platforms but other types of platforms can be handled in a similar manner.

Table VI shows steps in a procedure to boot a target machine from a disk image without requiring the placement, or existence, of a disk containing the image into a drive in the target machine.

TABLE VI

1. Load Managing Software onto target machine.
2. Setup DHCP to boot 1.44 MB image
3. Use BCTP to reboot target
4. Target sends DHCP request (step 1 of FIG. A)
5. OpForce server sends DHCP response
6. Target downloads OpBoot
7. OpBoot "boots" floppy image
8. Run user utility
9. Use OpBoot network stack to return result
10. OpForce server sets DHCP to load back to ActiveOS
11. Reboot target After step 1 of Table VI, it is assumed that Managing Software has been loaded into the target machine. Such software can be loaded, for example, as described above with respect to the ActiveOS software. In a preferred embodiment, the ActiveOS software, OpBoot and OpForce software performs the remaining steps of Table VI. Note that the operations, or steps, of Table VI can be performed by one or more types of different software and can be performed at one or more points in a system, such as the system of FIG. 1.

At step 2, DHCP is set to boot a standard 1.44 MB floppy image. The DHCP boot file is set to boot OpBoot (offset 0x6c in the DHCP packet). The DHCP specification defines a number of DHCP options. Options are identified by numeric numbers. DHCP option 135 passes an argument to OpBoot. This argument contains the name of the 1.44 MB image to download (via TFTP). An example of the argument format is: dhcp option-135 "dos=floppyimage.bin;additional arguments". The string "additional arguments" is returned on a call to vector 0xA1 (see step 8).

At step 3, BCTP is used to reboot the target machine.

Steps 4, 5 and 6, are similar to steps 1, 2 and 3, respectively of Table V. At step 4, the target machine uses DHCP to broadcast a request to the server to obtain an IP address. At step 5, the server sends a response. The target machine downloads boot software, such as OpBoot.

At step 7, the boot software obtains and boots to a floppy image. The floppy image can be the exact image that would reside on a floppy disk used to boot a PC from a disk drive. The floppy image is obtained from the server, or from some other source over, e.g., a network connection. It is not necessary for the target machine to obtain the floppy image from the floppy drive or from some other media-reading device connected to the target machine.

At step 8, the floppy image is executed to execute operations in accordance with the floppy image. These operations can be "user" directed such as installing and executing specific versions of operating systems, applications, drivers, utilities, etc. In general, any type of operation that can be performed by a floppy image in the traditional boot-up procedure (i.e., where the disk image is read from a floppy drive) can be performed using the system of the present invention.

The approach of the present invention may provide additional advantages not possible with the prior art approaches. For example, it may be possible to have a boot image that is greater than the 1.44 MB capacity of the physical floppy medium. Also, the booting process is not slowed by reading of a floppy disk or other physical media. This may allow advantages such as monitoring or diagnostics during the boot-up phase.

The arguments passed from the DHCP option-135 can be retrieved using the BIOS vector 0xA1. The OpBoot API provides functions that the user can call to access PXE services from within a standard MS-DOS program. It is accessed via INT A1h and is only accessible when booting MS-DOS boot images. Table VII, below, shows some of these functions. Not all of the functions use PXE parameters.

TABLE VII

Services:

Get version

In: AX = 0000h
Out: AL = version
AH = error code
CF set on error
Get boot parameters In: AX = 0001h
Out: ES:DI = points to null terminated character string
AH = error code
CF set on error
Get boot server IP In: AX = 0002h
Out: EBX = boot server IP address
AH = error code
CF set on error
Get gateway IP In: AX = 0003h
Out: EBX = gateway IP address
AH = error code
CF set on error
Get subnet mask In: AX = 0004h
Out: EBX = subnet mask
AH = error code
CF set on error
Get IP address In: AX = 0005h
Out: EBX = IP address
AH = error code
CF set on error
Open network In: AX = 0100h
Out: AH = error code
CF set on error
Close network In: AX = 0101h
Out: AH = error code
CF set on error
Read network In: AX = 0102h
CX = size of buffer
DX = destination port,
ES:SI = buffer to read into
Out: AH = error code
CF set on error
CX = number of bytes actually read
Write network In: AX = 0103h
EBX = HP address of destination
CX = number of bytes to write
EDX>>16 = destination port, DX = source port,
ES:SI = buffer to write
Out: AH = error code
CF set on error At step 9, the OpBoot network stack is used to return results to the server. This step is explained in more detail in co-pending the patent application referenced above, entitled "USE OF OFF-MOTHERBOARD RESOURCES IN A COMPUTER SYSTEM." This step is useful where, for example, the purpose of loading and executing the disk image is to run tests or gather other data from the system. In general, any type of information can be communicated.

At step 10, the target machine is set to load back to ActiveOS.

At step 11, the target machine is rebooted back to the Managing Software where the steps above can be repeated for another disk image, or for different purposes, as desired. Note that it is not necessary to perform all of the steps listed in Table VI to achieve advantages of the present invention. Also, additional steps may be included without detracting from the invention. The steps listed in Table VI are merely illustrative of a preferred embodiment.

Next, details of step 7 of Table VI are discussed in connection with FIG. 3. It should be apparent that these details can be performed in addition to other steps and need not have all operations executed in association with step 7 of Table VI.

Figure 3:
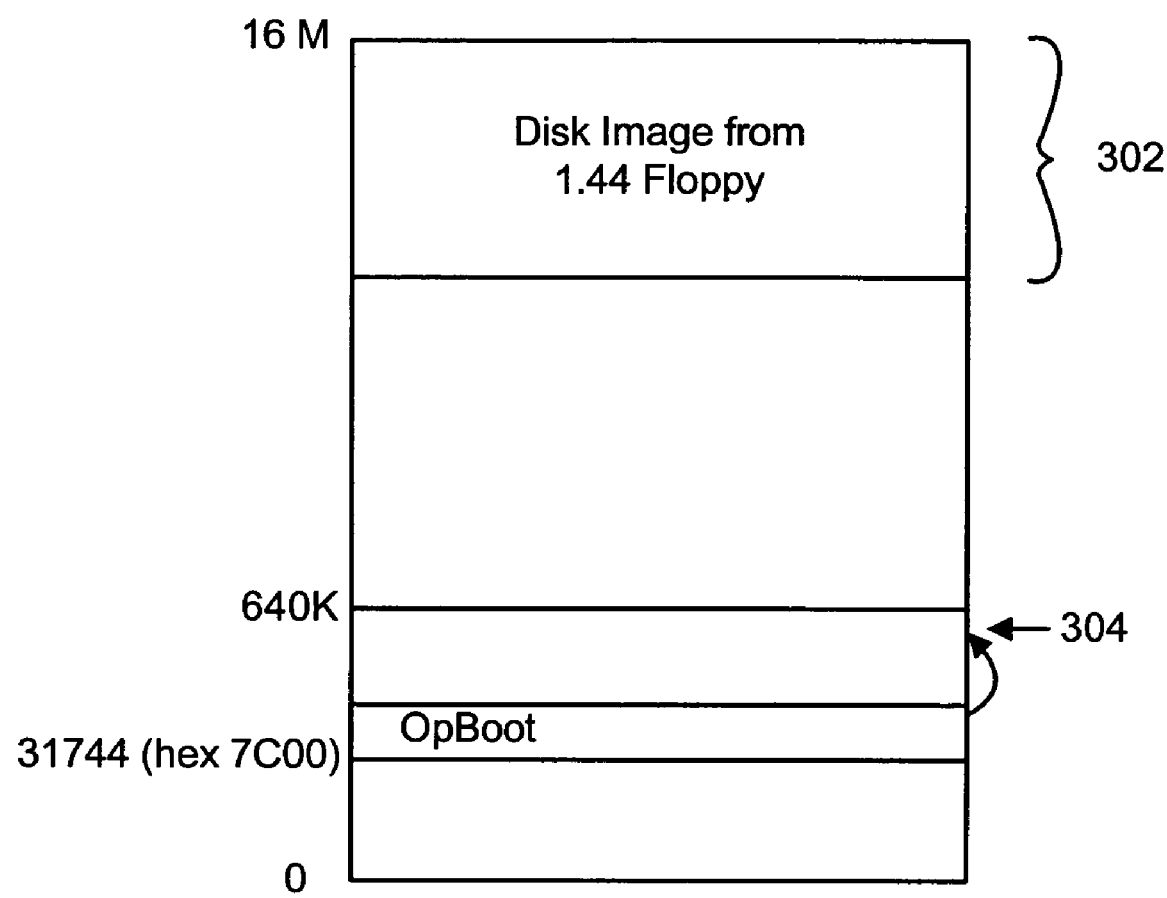
FIG. 3 depicts a memory map illustrating details of booting using a disk image.

FIG. 3 depicts a memory map of a PC to illustrate details of booting using a disk image. In FIG. 3, a BIOS native to the target machine is instructed (e.g., through DHCP, etc.) to load OpBoot at an area of low memory. Although the invention is discussed with respect to specific boot software, such as OpBoot, any appropriate software or set of instructions can be used.

OpBoot communicates with the server via TFTP to load a disk image. The disk image is loaded to an unused portion of memory such as at 302. In the preferred embodiment, the disk image is an exact image as would be present on a bootable floppy disk. However, other embodiments can use images that vary from such an image.

OpBoot changes vectors used by the native BIOS (e.g., the MSDOS BIOS manufactured by Microsoft, Inc.) as shown in Table VIII.

TABLE VIII

| Vector | Points to |
|---|---|
| 0x11 | Simulated Floppy Controller |
| 0x13 | maps A: to disk image or B: to another disk image |
| 0x15 | Changed to reserved memory for disk image or multiple disk images |

In Table VIII, the BIOS vector 0x11 (also called "interrupt 11h" or "INT 11h") is the hardware list interrupt. It returns what hardware is present in the system. The preferred embodiment intercepts the information returned and changes the information about the floppy drives in the system so that disk images are recognized as "physical" floppy drives.

Next, OpBoot is moved to a different memory location so it will not interfere with the booting according to the disk image. Initially, OpBoot is placed in memory starting at location (hexadecimal) 7C00 by PXE. In a preferred embodiment, OpBoot is moved to below the 640K mark at a later time, as shown at 304 of FIG. 3. In other embodiments, other locations can be used. Vector 0x15 is set to prevent other instructions from accessing memory area 302.

OpBoot emulates BIOS operation by loading the first 512 bytes of floppy data (in this case the floppy image data) into memory at 7C00. The first 512-bytes of the floppy then completes the "boot" of the floppy image. At this point, usually an OS, such as MS-DOS takes over. MS-DOS and MS-DOS programs use vector 0x13 to access the floppy drive. Usually 0x13 calls are redirected into the BIOS. In this case, they get redirected to OpBoot.

The floppy drive is typically accessed as "A:" pointed to by vector 0x13. Since vector 0x13 has been modified to point to the disk image stored at 302, the BIOS, instead, obtains data from locations at 302. At this point programs running on top of the floppy OS (such as MS-DOS) can use the vector 0xA1 (INT A1h) to obtain the arguments passed to it from the DHCP option-135.

As can be seen, the procedure described, above, essentially "tricks" the BIOS (or other operating system, kernel, boot-up routine, etc.) to use data from memory instead of attempting to read boot-up data from a floppy (or other device or location). In the preferred embodiment, a dynamic computing environment (DCE) is provided where many computers can be connected together, on demand, and automatically configured with software or made to perform desired tasks.

The ability to download bootable disk images to many target machines at boot-up (after power-up), allows a manager of the DCE to use customers' existing boot-up diskettes to create disk images that can be distributed instantly, as desired. This is a huge benefit to the DCE manager and to customers, alike. The customers do not have to redefine, reformat or reprogram boot-up parameters and the DCE manager does not have to attempt to understand, analyze or explain how boot-up disk images must be changed or converted. Moreover, since the physical medium (i.e., the diskette) has been eliminated, the boot-up information can be easily stored, tracked and transferred.

Table IX, below, shows basic steps in the OpBoot operation.

TABLE IX

Pseudo code for opboot:

1. Parse DHCP option 135 for arguments and floppy image name(s).
2. Download each floppy image into extended memory (see INT 15h).
3. Relocate OpBoot from 7C00 to just below the 640K mark.
4. Point the interrupt vectors 0x11, 0x13, 0x15, 0xA1 into OpBoot's code.
5. Load first sector of floppy into memory 7C00 and jump to it to complete boot process.
6. If a program (such as an MS-DOS program) calls vector 0x13, check if the program requested a floppy drive. If so, read and write the data from the downloaded image in extended memory instead of the physical floppy (if present).
7. If a program (such as an MS-DOS program) calls vector 0x11, fixup the floppy drive count to include the "fake" floppies in memory.
8. If a program (such as an MS-DOS program) calls vector 0x15, report the extended memory not including the memory reserved for the floppy images.
9. If a program (such as an MS-DOS program) calls vector 0xA1, return the requested information. If the request was for the parameters passed in DHCP option-135, use a saved copy of the parameters.

Although the system of the present invention has been described with respect to specific embodiments thereof, these embodiments are illustrative, and not restrictive, of the invention. For example, although the invention has been discussed primarily with respect to floppy disk images, it is possible to emulate booting of CD-ROM, tape or other media in similar manner to that described herein. Multiple disk images can be used. For example, B:, C:, D:, and other drives or devices can be redirected so that the BIOS obtains information from such devices from memory locations.

Further, this approach eliminates the need for having extra peripherals, such as floppy drives, connected to every machine.

Thus, the scope of the invention is to be determined solely by the appended claims.

What is claimed is:

1. A method comprising:
   storing a boot image in a memory of a computer system, wherein
      said storing comprises copying said boot image from a physical medium to said memory,
      said computer system is coupled to said physical medium via a network, and
      said copying comprises downloading said boot image from said physical medium to said memory via said network;
   executing said boot image from said memory; and
   causing a process executed by said computer system to initiate said executing,
      wherein said causing comprises
         modifying a vector in said computer system such that an attempt to access a physical storage unit results in said executing.

2. The method of claim 1, further comprising:
   in response to said copying, causing a process executed by said computer system to initiate said executing.

3. The method of claim 1, further comprising:
   changing a characteristic of said computer system, wherein said changing causes a process executed by said computer system to access said boot image.

4. The method of claim 3, wherein
   said changing causes said process executed by said computer system to access said boot image, if said process attempts to access a physical device.

5. The method of claim 4, further comprising:
   modifying a vector in said computer system such that an attempt to access a disk drive results in said executing said boot image.

6. The method of claim 4, further comprising:
   simulating a disk drive by modifying a vector in said computer system.

7. An apparatus comprising
   a target computer, comprising
      a first processor,
      a memory coupled to said first processor,
      a first computer readable medium coupled to said first processor, and
      first computer code, encoded in said first computer readable medium, configured to cause said first processor to
         store a boot image in said memory by virtue of being configured to cause said first processor to copy said boot image from a physical medium to said memory, wherein
            said physical medium is coupled to said first processor via a network, and
            said boot image is copied from said physical medium to said memory via said network;
         execute said boot image from said memory; and
         change a characteristic of said target computer, wherein said change causes a process executed by said target computer to initiate said first computer code configured to cause said first processor to execute said boot image from said memory.

8. The apparatus of claim 7, wherein said first computer code is further configured to cause said processor to:
   cause a process executed by said target computer to initiate said first computer code configured to cause said first processor to execute said boot image from said memory.

9. The apparatus of claim 7, wherein said first computer code is further configured to cause said processor to:
   in response to said first computer code configured to cause said processor to copy said boot image from said physical medium to said memory, cause a process executed by said target computer to initiate said first computer code configured to cause said first processor to execute said boot image from said memory.

10. The apparatus of claim 7, wherein
    said change causes said process executed by said target computer to access said boot image if said process attempts to access a physical device.

11. The apparatus of claim 7, further comprising:
    a server computer, coupled to said target computer and comprising
       a second processor,
       a second computer readable medium coupled to said second processor, wherein said second computer readable medium comprises said physical medium, and
       second computer code, encoded in said second computer readable medium, configured to cause said second processor to download said boot image to said target computer.

12. The apparatus of claim 11, wherein said second computer code configured to cause said second processor is further configured to:
    cause said first processor to store said boot image in said memory and to execute said boot image from said memory.

13. The apparatus of claim 12, further comprising:
    a network, wherein
       said target computer and said server computer are coupled to one another via said network, and
       second computer code configured to cause said second processor to download said boot image to said target computer is further configured to cause said second processor to download said boot image to said target computer via said network.

14. A computer program product comprising:
    a first set of instructions, executable on a computer system, configured to store a boot image in a memory of said computer system, wherein
       said first set of instructions comprises a first subset of instructions, executable on
       said computer system, configured to copy said boot image from a physical medium to said memory,
       said computer system is coupled to said physical medium via a network, and
       said first subset of instructions comprises a first subsubset of instructions, executable on said computer system, configured to download said boot image from said physical medium to said memory via said network; and
    a second set of instructions, executable on said computer system, configured to execute said boot image from said memory;
    a third set of instructions, executable on said computer system, configured to change a characteristic of said computer system, wherein said third set of instructions cause a process executed by said computer system to execute said second set of instructions; and computer readable media, wherein said computer program product is encoded in said computer readable media.

15. The computer program product of claim 14, further comprising:
a fourth set of instructions, executable on said computer system, configured to cause a process executed by said computer system to initiate said second set of instructions.

16. The computer program product of claim 15, further comprising:
a fifth set of instructions, executable on said computer system, configured to modify a vector in said computer system such that an attempt to access a physical storage unit results in said executing.

17. The computer program product of claim 14, wherein said fourth set of instructions cause said process executed by said computer system to access said boot image, if said process attempts to access a physical device.

18. A computer system comprising
a memory,
means for storing a boot image in said memory, wherein said means for storing is coupled to said memory, wherein
said means for storing comprises first means for copying said boot image from a physical medium to said memory,
said computer system is coupled to said physical medium via a network, and
said first means for copying comprises means for downloading said boot image from said physical medium to said memory via said network,
means for executing said boot image from said memory, wherein said means for executing said boot image is coupled to said memory, and
means for causing a process executed by said computer system to initialize said
means for executing wherein said means for causing comprises
means for modifying a vector in said computer system such that an attempt to access a physical storage unit results in said executing.

19. The computer system of claim 18, further comprising:
a computer readable medium comprising said physical medium; and
second means for copying said boot image from said computer readable medium to said memory, wherein said second means for copying comprises said first means for copying.

20. The computer system of claim 19, further comprising:
means for changing a characteristic of said computer system, wherein said means for changing is configured to cause a process executed by said computer system to initiate said boot image.

21. The computer system of claim 18, further comprising:
means for causing a process executed by said computer system to initiate said executing, responsive to said first means for copying.

22. A computer system comprising:
a memory,
means for storing a boot image in said memory, wherein said means for storing is coupled to said memory, wherein
said means for storing comprises first means for copying said boot image from a physical medium to said memory,
said computer system is coupled to said physical medium via a network, and
said first means for copying comprises means for downloading said boot image from said physical medium to said memory via said network;
means for executing said boot image from said memory, wherein said means for executing said boot image is coupled to said memory; and
means for changing a characteristic of said computer system, wherein said changing causes a process executed by said computer system to access said boot image.

23. The computer system of claim 22, wherein
said means for changing is configured to cause said process executed by said computer system to access said boot image, if said process attempts to access a physical device.

24. The computer system of claim 23, further comprising:
means for modifying a vector in said computer system such that an attempt to access a disk drive results in said executing said boot image.

25. The computer system of claim 23, further comprising:
means for simulating a disk drive comprising means for modifying a vector in said computer system.

* * * * *